United States Patent [19]
Keckler

[11] 3,961,435
[45] June 8, 1976

[54] CUSTOMER-OPERATED MERCHANDISE LOCATING DEVICE

[76] Inventor: Dan L. Keckler, 5411 Taylor St., Davenport, Iowa 52806

[22] Filed: Nov. 21, 1975

[21] Appl. No.: 634,130

Related U.S. Application Data

[60] Continuation of Ser. No. 542,641, Jan. 20, 1975, abandoned, Division of Ser. No. 451,594, March 15, 1974, abandoned.

[52] U.S. Cl. .............................. 40/130 R; 40/132 D
[51] Int. Cl.² .......................................... G09F 13/04
[58] Field of Search .......... 40/130 R, 130 L, 132 R, 40/132 D; 35/1

[56] References Cited
UNITED STATES PATENTS

| | | | |
|---|---|---|---|
| 1,737,520 | 11/1929 | Richardson | 40/130 L X |
| 1,867,048 | 7/1932 | Abel | 40/130 R X |
| 1,884,500 | 10/1932 | Anderson | 40/130 R X |
| 3,194,954 | 7/1965 | Locke | 40/132 D X |
| 3,562,942 | 2/1971 | Mabrey | 40/132 R |
| 3,608,222 | 9/1971 | Koch | 35/1 |
| 3,754,244 | 8/1973 | Garrett | 40/132 D X |

*Primary Examiner*—John F. Pitrelli
*Attorney, Agent, or Firm*—Glenn H. Antrim

[57] ABSTRACT

A translucent display panel shows a floor plan of contrasting tape or marks indicating positions of display cabinets. The floor plan is divided into small areas to which numbers are assigned, and the numbers are displayed in a store directory under respective merchandise located in the number areas. An electrical control panel having contacts marked by the same numbers is connected to control illumination of lamps. Lamp mounting means below the translucent display panel facilitates placing a lamp below any desired one of the small areas of the display panel, and wiring is completed from the numbered contacts of the control panel and the respective lamps. Both the translucent display panel and the lamp mounting means are easily removable from their cabinet to facilitate changes in the floor plan and the positions of the lamps. One means for mounting lamps has two panels and spring contacts, and another has a wire mesh and adapters for sockets, any of the adapters fitting tightly in a chosen position in the wire mesh. A frame having the latter means for mounting lamps can readily be removed as a drawer from the cabinet and placed above the translucent display panel to facilitate accurate placement of the lamps while the operator looks down through the wire mesh to the floor plan on the translucent display panel.

1 Claim, 13 Drawing Figures

CUSTOMER-OPERATED MERCHANDISE LOCATING DEVICE

This is a continuation of Application Ser. No. 542,641, filed Jan. 20, 1975, now abandoned, which is a Division of Application Number 451,594, filed March 15, 1974, now abandoned.

BACKGROUND OF THE INVENTION

This invention relates to display devices having light-transmitting panels adjacent sources of light and particularly to display devices having display panels easily adaptable to show different floor plans and having light means selectively operable to show respective locations on the floor plans.

Customers desiring to purchase particular items having difficulty in finding these items in large stores that carry many lines of merchandise. Many stores supply wall directories, but the directories themselves are not always easily located. The items are usually included in broad classifications of goods in the directory, and a customer may still not know from the directory in which part of the store the particular item is to be found.

Back-lighted display panels have been used in equipments for instructional purposes and for games. Changing of the displays on the panels are often cumbersome, and the illumination of lamps is controlled either by automatic control circuits or by trained technicians.

SUMMARY OF THE INVENTION

An object of this invention is to have in a display device a back-lighted translucent panel on which a floor plan can be readily placed and changed.

Another object is to have a mounting panel for lamps that is easily removable from its cabinet and that accommodates lamps in any selected locations on the panel.

Another object is to have control means easily operated by customers for operating the lamps selectively to show location of desired merchandise on the floor plan.

Another object is to provide in the display cabinet supporting means that accommodates removal of the panel or frame on which the lamps are to be mounted, from its normal position below the translucent display panel to a temporary position above the display panel. While in the temporary position, the lamps can be positioned quickly and accurately with respect to the floor plan, and then the mounting panel can be easily returned to its normal position.

A display panel is preferably a sheet of translucent material that can be removed easily from the cabinet in which the locating device is housed. Preferably, at least one side of the display panel is smooth so that materials, such as tape, can be easily applied or removed for making and changing floor plans. A frame in which lamps can be readily mounted in chosen positions parallel to the translucent display panel is easily removable. The frame also includes an electrical control panel and connecting means to connect contacts of the control panel selectively to the lamps mounted in the frame.

In one embodiment the removable frame in which the lamps are mounted comprises two parallel panels. The panel that is closer to the translucent display panel may be conductive material such as aluminum and have mounting holes into which small lamps such as flashlight lamps may be mounted. The outer contact or shell of each of the lamps contacts the conductive panel functioning as a common conductor for the lamp circuit. An insulating panel spaced from the conductive panel has electrical spring contacts, each being positioned to contact the center conductor of the lamp placed in a respective mounting hold. Individual conductors or wire connect these spring contacts as required to particular control contacts. Another embodiment uses a frame with a wire mesh in which the lamps are mounted. Sockets for receiving the lamps are mounted in adapters, and the adapters are positioned in desired locations in the wire mesh.

For convenience, the control panel may have common push buttons having inserts with numbers corresponding to locations of merchandise as shown on a directory. For economy, simple contacts having respective numbers near them may be substituted for the push buttons, and a wand or probe with a flexible cord might be used to complete a desired circuit by touching the point of the wand to the desired contact on the control board.

DESCRIPTION OF THE PREFERRED EMBODIMENTS

Figure 1:
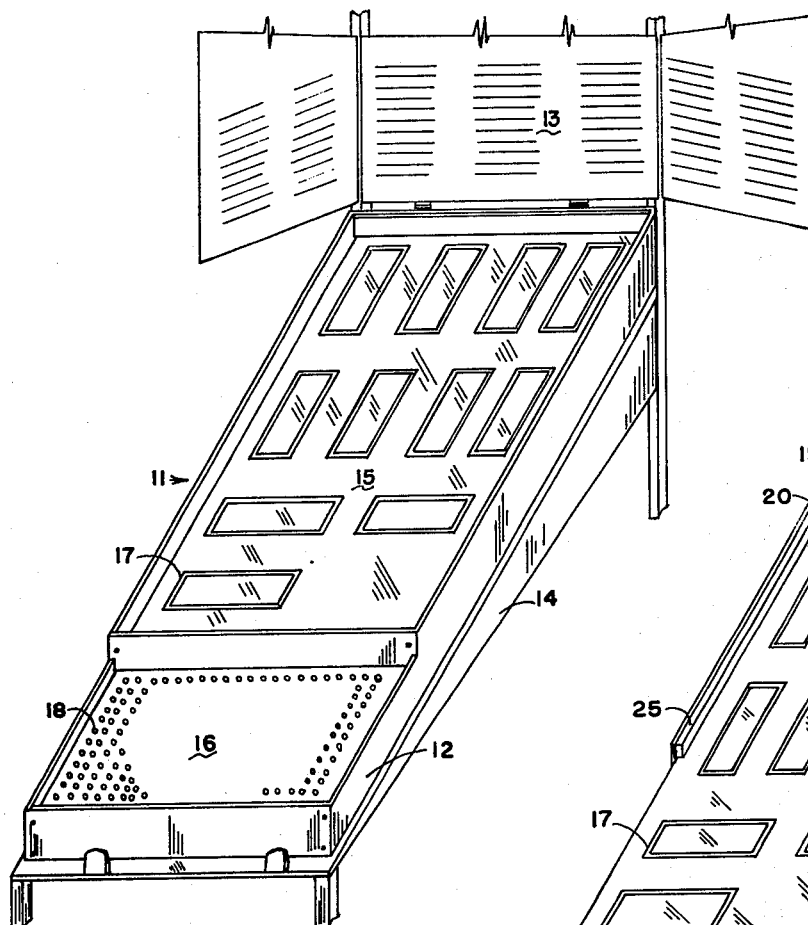
FIG. 1 is a top perspective view of the locating device of this invention, a portion of a directory attached to the cabinet of the device is shown.

As shown in FIG. 1, the locating device 11 is housed in a rectangular cabinet 12 having a top divided into a rear portion containing a display panel 15 and a shorter control portion having a control panel 16. The control panel may be a front portion as described below of a panel mounted below the display panel 15. A store directory 13 may be displayed near the device, or it may be attached to the rear of the cabinet 12 as shown. The attached directory 13 has hinges to facilitate folding it inwardly and downwardly on top of the display cabinet 12 when the locating device 11 is to be transported. The cabinet 12 is shown on a sloping top of a stand 14 that may also have upwardly extending rear posts to support the store directory 13 vertically while it is in use.

Figure 9:
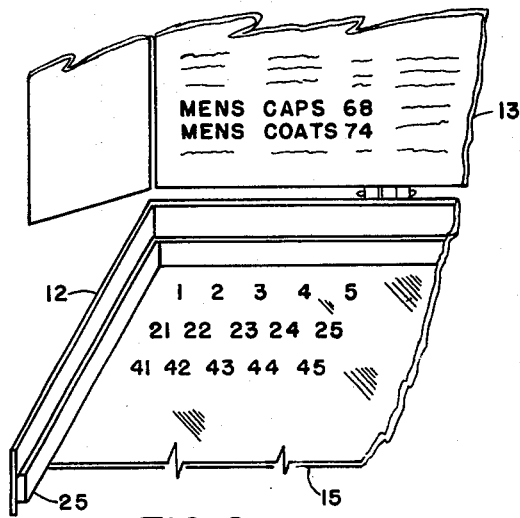
FIG. 9 is a fragmentary top perspective view of the display panel mounted in its cabinet and a lower portion of the directory, both of which have numbers indicating locations.

The display panel 15 is preferably fabricated from translucent plastic material and for locating purposes is divided into many small areas that can be numbered as shown in FIG. 9. The numbers can be placed on the upper surface of the panel 15 by translucent letters that are available for marking purposes. After a plan is made of the approximate locations of display panels, adhesive tape 17 is positioned on the panel 15 to provide a floor plan of the display counters.

Figure 2:
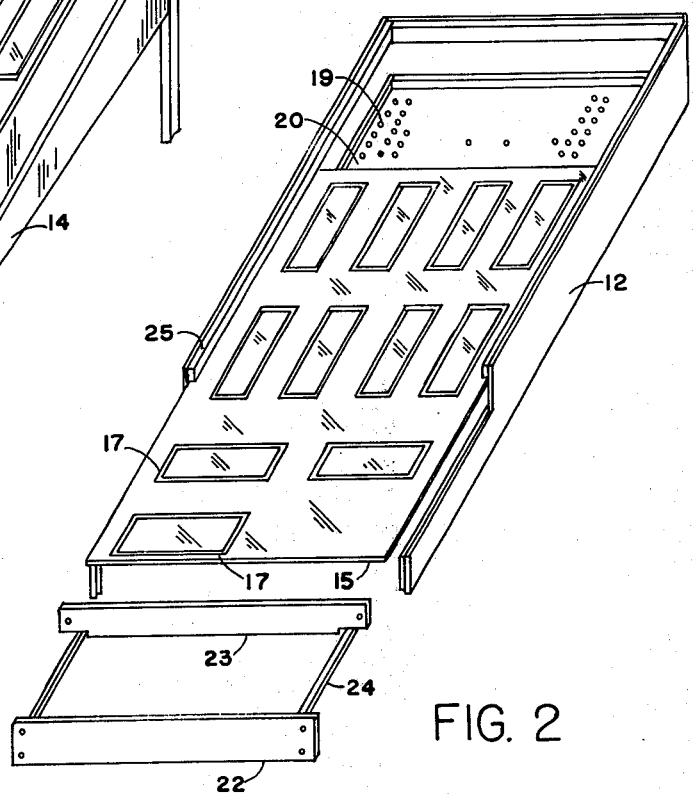
FIG. 2 is a top perspective view of the locating device with its front retaining portion removed and its display panel partly removed.

The control panel 16 includes closely spaced push buttons 18, and the buttons 18 are marked either by inserts containing numbers or adjacent numbers on the panel 16. As shown in FIG. 2, lamps 19 in desired locations are mounted in a plane just below the translucent display panel 15, and according to FIGS. 3 and 4, the lamps 19 are mounted in a conductive panel 20, and this panel is the upper panel of two panels in the mounting frame 21.

Figure 3:
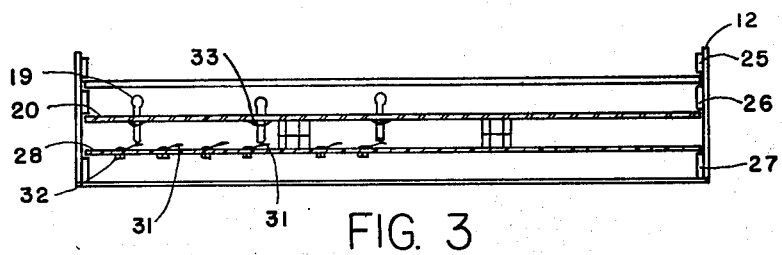
FIG. 3 is a lateral cross section view of the cabinet of FIG. 1 through the portion where lamps are mounted.

The translucent panel 15 and the frame 21 including the panel 20 on which lamps 19 are mounted may be easily slid out the front of the cabinet to facilitate making changes in the floor plan on the display panel 15 and placing lamps 19 in desired locations corresponding to locations of merchandise on the floor plan. As shown in FIG. 2, the end piece 23 for the top portion of the cabinet 12 and the end piece 22 for the longer, lower portion of the cabinet are joined by a pair of brackets 24 and may be easily removed by removing conventional screw fasteners (not shown). In FIG. 3, the panels within the cabinet are contained within grooves formed by properly spaced longitudinal parallel strips 25, 26, and 27 on the inside surfaces of the sides of the cabinet 12.

Figure 4:
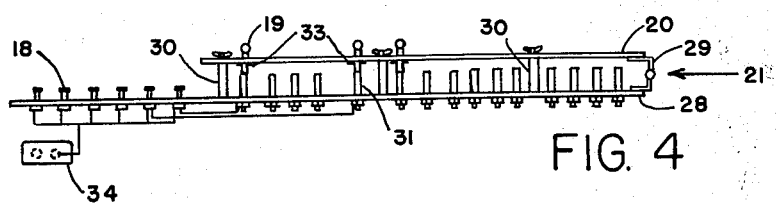
FIG. 4 is a longitudinal cross sectional view of the mounting frame removed from the display cabinet, the frame having two panels.

The panel 20 in which the lamps 19 are mounted and a lower panel 28 for electrical contacts 31 are spaced parallel in a mounting frame 21 that slides in the groove between the strips 26 and 27. With reference to FIG. 4, in order to have access to contacts 31 mounted on the panel 28, the panels 20 and 28 are joined at the rear by a hinge or a pair of hinges 29. The panels are normally maintained substantially parallel by conventional spacers 30 and their associated screws, the spacers being distributed as required to make the spring contacts 31 bear against the center terminals of the lamps. The length of the panel 20 in which the lamps 19 are mounted is slightly less than the length of the upper portion of the cabinet 12; whereas, the length of the lower panel 28 of the mounting frame 21 extends the full inside length of the cabinet 12. The front portion of the panel 28 serves as a control panel having mounting spaces for the push buttons 18 of FIGS. 1 and 4.

Figure 5:
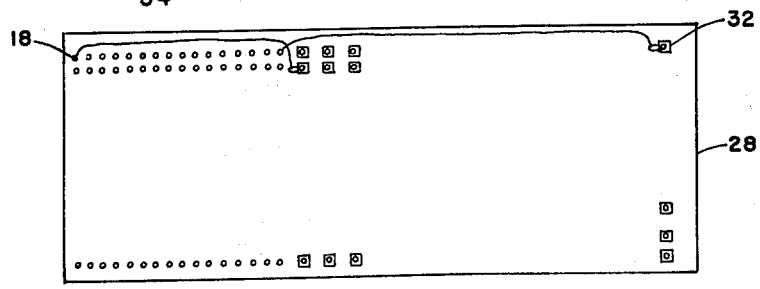
FIG. 5 is a bottom view of the mounting frame or lower panel of FIG. 4.
Figure 6:
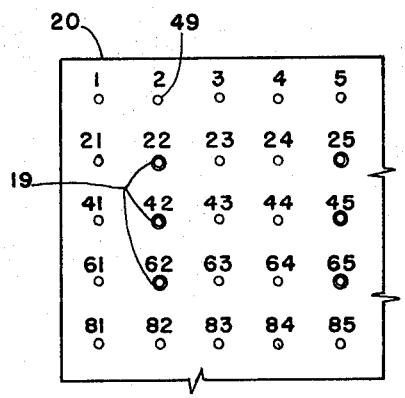
FIG. 6 is a fragmentary top view of the upper panel of the frame of FIG. 4.
Figure 7:
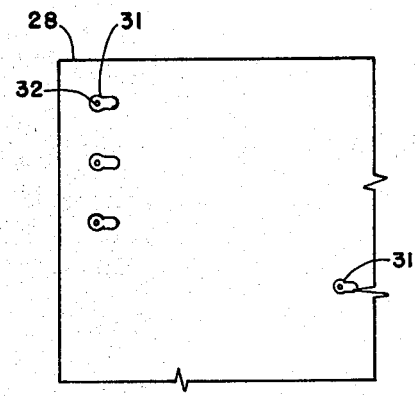
FIG. 7 is a top view of the lower panel of the frame of FIG. 4.
Figure 8:
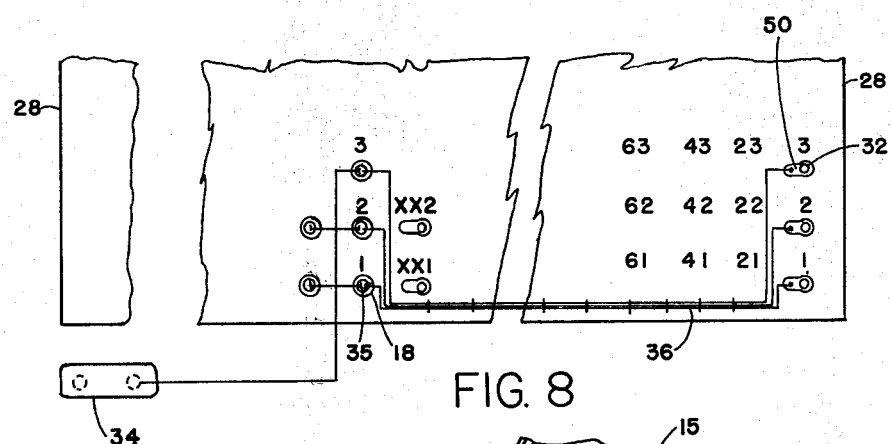
FIG. 8 is a fragmentary bottom view of the lower panel FIG. 5 to show more clearly means for wiring between control buttons and lamps.

The bases of the lamps 19 extend downwardly through the conductive panel 20 and spring contacts 31 extend upwardly from the panel 28 below the positions for the lamps. Panel 28 is fabricated from insulating material such as plastic or fiberboard. The distance between the panels 20 and 28 is such that the center contacts at the end of the base of the lamps 19 bear firmly against the top surfaces of the spring contacts 31. According to FIGS. 4 and 6, the panel 20 may be fabricated from aluminum and have drilled through it holes 49 arranged in rows. The diameter of the holes 49 is slightly larger than the diameter of the bases of the lamps 19. When screw bases or bayonet bases are used, they may be screwed into spring retainers 33 below the panel 20 to retain the lamps and to provide a good contact between the usual outer conductive surfaces or terminals of the lamps 19. The spring contacts 31 may be either S-shaped or U-shaped and fastened to the panel 28 by fasteners 32. When these retainers are screws, they can also serve to retain soldering lugs 50 (FIG. 8) for completing circuits to the center contacts of the lamps 19. The circuit for operating the lamps 19 is a usual circuit including a battery pack 34, and the push buttons 18. In FIG. 4, the battery pack 34 has one terminal connected in common to one terminal 35 of every push button 18, and the other terminal connected in common to a terminal of every lamp 19. As described above, the panel 20 may be fabricated from aluminum; it serves as a common terminal to the lamps. Individual connections between the other terminal of every lamp 19 and the other terminals of the push buttons 18 are completed on the bottom of the panel 28 as shown in FIGS. 5 and 8. Wires from one terminal of each of the push buttons 18 may be connected through a cable 36 to the soldering lugs 50 that are connected under selected fasteners 32 opposite positions where lamps 19 are inserted.

Various procedures may be followed to determine where the lamps 19 are to be inserted in the panel 20 and which push buttons are to be connected to these lamps. When numbers are placed on the surface of the panel 15 as shown in FIG. 9 to correspond to the numbering of the mounting holes shown in FIG. 6 for the lamps 19, the same numbers for the respective lamps also appear adjacent the respective fasteners or connectors 32 on the bottom of the insulating panel 28 shown in FIG. 8. If there are as many push buttons 18 as there are spaces for lamps, the numbers for the positions of the lamps, the numbers for the push buttons, and the numbers on the directory can be completely correlated. When fewer push buttons are provided than the number of spaces for lamps, a chart can be made showing which number of any push button is connected to a lamp having a particular number, and then the number in the store directory for a particular merchandise will correspond to the marking on the control panel for the push button. Operation of the push button will cause a lamp to be illuminated where the merchandise is located on the floor plan.

Figure 10:
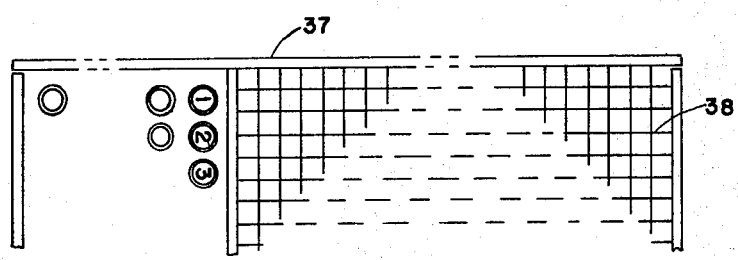
FIG. 10 is a top view of another embodiment of a frame having wire mesh for positioning lamps and having a front portion for push buttons.
Figure 11:
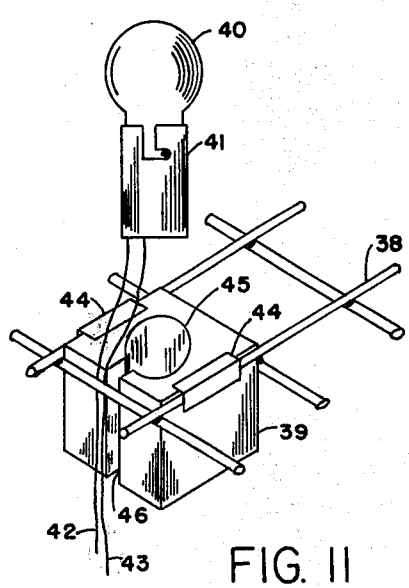
FIG. 11 is a top perspective view of a fragmentary portion of the mounting wire mesh shown in FIG. 10 and an adapter mounted within the mesh.
Figure 12:
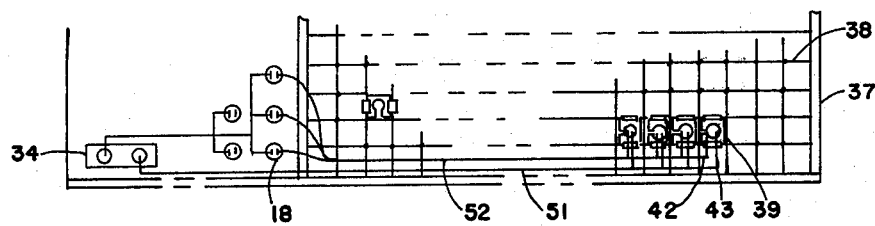
FIG. 12 is a fragmentary bottom view of the embodiments of the frame and mounting devices of FIGS. 10 and 11 to show wiring between the lamps and the push buttons of the control panel.

A frame 37 according to FIGS. 10–12 can be used for mounting the lamps rather than the embodiment shown in FIGS. 4 and 5. As shown in FIG. 4, the frame of FIGS. 10 and 11 has a front portion on which push buttons are mounted, and a rear portion comprises a grid of conductors positioned across the frame for receiving lamps in any of the desired openings of the grid. In a preferred embodiment, the mounting grid for the lamps comprises a tightly stretched wire mesh 38. An adapter 39 of FIG. 11 is used to mount one of the lamps 40 within any of the chosen spaces in the mesh 38. Each of the lamps 40 is mounted in a cylindrical socket 41. The socket has two wires 42 and 43 for connecting the lamp to a respective push button 18 and the battery pack 34. Each adapter 39 is a cube of plastic material with such outer dimensions that it fits tightly within any chosen open space in the wire mesh 38. Two brackets 44 mounted along opposite edges of the top of the adapter 39 fit tightly over the adjacent portions of the wire mesh 38 to hold the socket firmly in place. An axial round opening 45 through the adapter receives the socket 41 tightly. A slot 46 extending through a wall of the adapter 39 in a direction parallel to the axis of the opening 45 provides a passageway through one side. The wires 42 and 43 are drawn through the slot 46 and extend from the bottom of the socket positioned in the opening 45 of the adapter 39. A typical placement of the sockets with their lamps is shown in FIG. 12. The wires 43 from each of the sockets 41 are made into a cable 51 that is connected to one terminal of the battery pack 34, and the other wires 42 from the socket 41 are connected in a cable 52 for connection to respective push buttons 18. Rather than using individual wires from each of the sockets 41, the wire mesh 38 may be used as a common conductor to the shells of the sockets 41. The adapters 39 may be metal to complete a circuit between the sockets 41 and the wire mesh 38, or a thin metal strip may connect the inside surface of the socket openings 45 and the brackets 44.

Combined push button panels and lamp mounting frames with grids similar to those shown in FIGS. 10–12 facilitate accurate and rapid placement of the lamps to show relocation of merchandise or the placement of new merchandise. As described above, the frame 37 is normally mounted below the translucent display panel 15 that is mounted between the strips 25 and 26 (FIG. 3) of the display cabinet. For positioning lamps in particular openings of the mesh 38, the push-button and lamp-mounting frame 37 of FIG. 12 is slid forwardly out of the cabinet 12 of FIG. 2 from its normal position. The frame 37 is then slid rearwardly on top of the mounting strips 25 within the top edges of the sides of the cabinet 12 until the rear edge of the frame is stopped by the end of the cabinet. The front portion of the frame 37 that corresponds to the control panel 16 of FIG. 1 is merely supported freely over the front, lower portion of the cabinet 12. The cabinet 12 now functions as an alignment tool to aid in the placement of the sockets or adapters 39 of FIG. 11 for positioning lamps 40 accurately in desired locations over a floor plan shown on the display panel 15. While the mounting frame 37 is positioned tightly between the edges of the cabinet 12, the openings in the grid or mesh 38 in a direction perpendicular to the translucent display panel 15 are above their respective, normal positions that they will have when the frame 37 is positioned normally below the translucent display panel 15. Therefore, an operator who is setting up the merchandise locating device merely has to look downwardly in a direction perpendicular to the panel 15 through the wire mesh 38 for determining the placement of the lamp 40 for indicating a particular position of certain merchandise.

The marking of a particular push button 18 for lighting the lamp is facilitated by having the control panel 16 as the front portion of the frame 37. Conveniently, the push buttons 18 are arranged in rows somewhat in alignment with the openings in the grid 38 such that the positions of the push buttons and the lamps can be readily correlated visually. After the lamps have been positioned, the frame 37 is removed from the position above the translucent panel 15, is slid into the cabinet in its normal position below the panel, and is retained by the end piece 22 of the cabinet as shown in FIG. 2. The set-up procedure positions the lamps 40 directly below desired locations of the floor plan that is on the translucent panel 15 and therefore prepares the display device for immediate operation.

Figure 13:
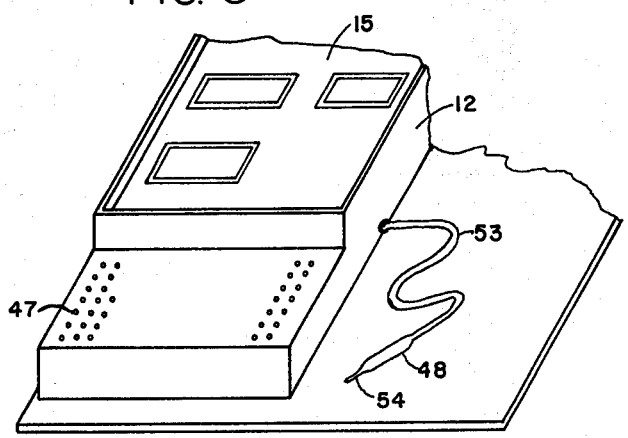
FIG. 13 is a fragmentary top perspective view of the front of the assembled cabinet of a different embodiment of the display device to show the use of contacts and a wand in place of buttons on the control panel.

The push buttons 18 shown either in the frame 21 in FIG. 4 or in the frame 37 of FIG. 12 can be replaced by less expensive contacts 47 of FIG. 13. Each of the contacts may consist simply of a small head attached to a shank that extends through the control portion of the mounting board. Each of these contacts as required are connected to a respective lamp 19 of FIG. 2 or its corresponding lamp 40 of FIG. 11. One terminal of the battery pack 34 that has been described as being connected to a common connection of the push buttons 18 is now connected to a wand or probe 48 through a flexible, insulated lead 53. The conductor of the lead 53 is connected to a point 54 of the probe, and when the point is touched to any of the chosen contacts 47 having a number corresponding to the number of desired merchandise, a respective lamp 19 or 40 is illuminated.

I claim:
1. A merchandise locating device comprising:
a rectangular display cabinet,
a light-transmitting display panel having a floor plan thereon,
a plurality of light-emitting devices,
an array of electrical switches,
a mounting frame having said array of electrical switches on one end portion thereof and a grid extending across the other end portion thereof, said grid providing closely spaced openings adapted to receive said light-emitting devices individually at selected points on said grid, each of said light-emitting devices being readily removable from any of said openings and positional in another of said openings, conductive means interconnecting said switches and said light-emitting devices to provide selective illumination of said light-emitting devices,
first supporting members along the inside walls of the sides of said cabinet adapted to receive said light-transmitting display panel as a drawer insertable from one end of said cabinet, the upper surface of said light-transmitting display panel being visible while the panel is normally inserted in said cabinet,
second supporting means along inside walls at positions below said first supporting members adapted to receive said mounting frame as a drawer in a normal position for locating said grid a short distance below said light-transmitting display panel, said grid being coextensive with said floor plan while said light-transmitting display panel and said mounting frame are in their respective normal positions in said cabinet, and
third supporting means within the upper inside edge of said sides of said display cabinet for supporting said mounting frame in a temporary position above said light-transmitting panel to facilitate accurate positioning of said light-emitting devices, each opening of said grid being closest to the same respective point on said floor plan whether said grid is mounted either temporarily above or normally below said floor plan.

* * * * *